Jan. 5, 1937.   R. F. HENN   2,066,886
IMPLEMENT ATTACHMENT
Filed Dec. 4, 1935

INVENTOR.
Ralph F. Henn
BY
Louis J. McBane.
ATTORNEY.

Patented Jan. 5, 1937

2,066,886

UNITED STATES PATENT OFFICE 2,066,886

IMPLEMENT ATTACHMENT

Ralph F. Henn, Geneva, Ohio

Application December 4, 1935, Serial No. 52,836

2 Claims. (Cl. 248—360)

This invention relates to an attachment for the handle of an implement, such as a mop, broom, or the like.

It is common to provide the unattached end of the handle of an implement with an attachment for hanging the implement on a bracket provided for that purpose. Usually such attachments consist of a metal cap, to fit over the handle end, on which a bail is mounted for free movement about the ends of the bail which enter diametrically arranged apertures in the cap; the cap is secured to the handle by a nail or screw extending through a hole in the cap and into the handle. Such an attachment is expensive out of proportion to its function as a part of the implement. The manufacture of the cap requires expensive presses and a plurality of operations. The bail is an additional part which involves the operation of assembly with the cap. The cap fits loosely on the handle end and it must be arranged carefully in proper position when fastening it in place, both for appearance and to place the bail in effective position. These operations require time, skill and expense out of proportion to the value added to the implement by the addition of the attachment. And, the structure is easily damaged by abuse and may become non-effective for performing the intended function by the wear of ordinary use over a period of time.

It is an object of this invention to provide a novel attachment for implements, such as mops and the like, by which the implement may be attached to a fixture. It is an object to provide such an attachment which may be manufactured by a simple and inexpensive technique, which may be attached to a handle easily, without skill, without the use of tools, which is self-aligning, which inherently affords a secure connection with a handle. It is an object to provide such an attachment which functions in an improved way.

Other objects and advantages of the invention will appear in the following detailed description taken in connection with the accompanying drawing, in which.

There are three factors to be considered in providing an attachment for an implement handle; namely, the utility of the attachment, assembly of the attachment with the handle, and cost of manufacture. Utility, in an attachment for an implement handle, is to be found in the security of the connection between the handle and the attachment, the durability and resistance to destruction by abuse, effectiveness for performing the desired function, and long life of usefulness under ordinary wear. The assembly of the attachment with the handle is a matter of cost, ease of attachment, and of the correct arrangement or alignment, for proper functioning, between the handle and the attachment. The cost of manufacture is determined largely by the cost of materials, the number of operations in working and assembly, and the amenability to automatic machine methods of production.

Figure 1:
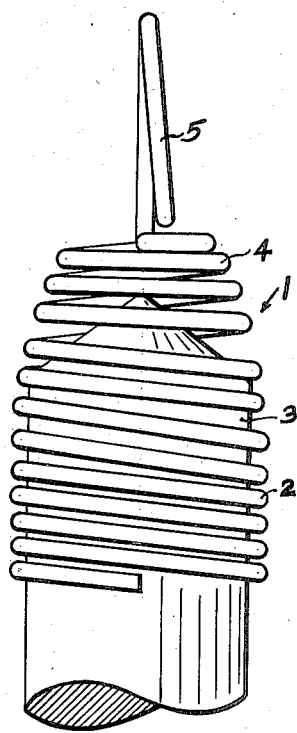
Figure 1 is a view in side elevation of an attachment arranged on the end of a handle.

As shown in Figure 1, the attachment 1 has a handle engaging part 2 which is a coil spring, conventional in every respect. The coil spring 2 is arranged around the handle end 3, which is smooth and in the same condition as any other part of the handle, unaltered in any way for receiving the coil spring 2. The coil spring 2 is of a size snugly to fit on the handle 3, it being slightly less, in internal diameter, than the diameter of the handle, so that, when arranged on the handle, it is sprung slightly. The coil spring 2 may be turned in a direction to screw the coil onto the handle, considering the turns of the coil as analogous to screw-threads. The friction between the handle and the spring causes the coil to open slightly and to allow the coil to screw onto the handle easily, using only the hands for the operation. The coil spring 2 may be screwed onto the handle end 3 any desired distance, or until a turn of greater curvature engages the handle end.

The circumstances that the handle requires no operations to prepare it for receiving the attachment and that the attachment may be arranged on the handle end by a simple turning operation with the bare hands, and that no other attaching device is used, makes the cost of assembly a minimum. Since the attachment may be arranged on the handle by a simple turning operation with the hands, the attachment may be sold unattached, leaving the operation of mounting the attachment to the user. The ease of attachment is apparent. Since the coil spring has its own axis, when it is turned onto the handle 3, by a screw-like operation, it aligns itself so that improper application of the attachment is impossible; the prior art attachment before described required skill and care for mounting it correctly.

The coil spring 2 snugly fits the handle and when any attempt to remove the attachment, by pulling on it endwise, is made, the pull exerted tensions the spring coil causing it to tighten on the handle, and the greater the tension the more tightly does the spring coil grip the handle. This action makes it virtually impossible to pull the attachment off endwise. When an effort is made to unscrew the attachment, the turning force exerted tightens the spring coil on the handle and the frictional grip prevents turning of the coil; the attachment cannot be unscrewed. When the attachment is turned in a direction to "screw-on" the coil spring 2, the coil is sprung enough to permit turning movement, and if, at the same time, the attachment is pulled endwise with considerable force it may be worked off the handle gradually. Thus, the attachment can be removed only by a peculiar action which requires an intentional effort to accomplish and it cannot be removed accidentally by any action to which it is likely ever to be subjected. Thus the simple coil spring 2, which permits of such easy and economical attachment, affords a secure connection with the handle under any ordinary conditions of use. That security of connection is obtained solely by the action, on the handle, inherent in the coil spring 2 under the various forces to which it may be subjected, no additional securing means being provided.

The coil spring 2 terminates in the conical extension 4 which extends beyond the end of handle 3 when the attachment is arranged in place. The conical extension 4 ends in a loop 5 of the wire of which the whole attachment is made. The loop 5 serves as a means for engaging a fixture to support the implement. The conical extension 4 is flexible and resilient and serves to absorb blows and loads on the loop 5, accidentally incurred, which would bend the loop 5 out of shape or position, and thus to protect the loop 5 from such injury as would impair its usefulness. The loop 5 stands upright in a position where it is most readily usable, a great advantage over the bail type of attachment; and this exposure of the loop 5 to accidental abuse renders the protection afforded by the flexible and resilient extension 4 an important factor in a long life of usefulness of the loop 5. Thus effective function and long useful life are afforded. Durability of the attachment accrues from the material of which it is made, hard steel wire or spring wire.

The attachment 1 consists of one piece of hard steel wire coiled and shaped to provide the various parts described. The cost of the material is low, the operations for making the attachment are commonplace and may be executed by machine at very low cost. Thus the attachment 1, with all the characteristics pointed out above, is exceedingly low in cost of manufacture.

Figure 2:
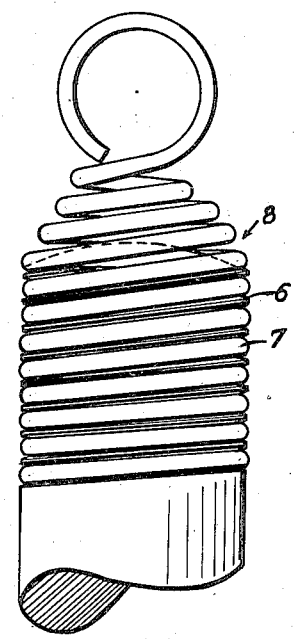
Figure 2 is a view similar to Figure 1 of a modification.

A modification is illustrated in Figure 2. There the handle is provided with a thread 6 and the coil spring 7 of the attachment 8 screws into the thread. This construction differs, in operation, from the form of Figure 1, in one respect, it is virtually impossible to remove the attachment of Figure 2. The attachment 8 may be applied to the handle with ease similar to that of Figure 1 but, due to the fact that the attachment cannot be unscrewed, as explained in connection with Figure 1, it cannot be removed by unscrewing and the threads of the handle prevent removal in any other way. The attachment can only be forced off with tools by operations which destroy its utility.

The loop 5 is one form of means for performing a particular function. Obviously, other forms may be provided for performing the same function, or for performing other functions, or different functions, within the scope of this invention.

The invention has been described in detail by way of illustration. It is not intended so to limit the invention since variations therein may be made by one skilled in the art without departing from the spirit and scope of the invention as defined in the following claims.

What I claim as my invention is as follows:

1. An attachment for implement handles comprising a single wire, one portion of the wire being coiled in the form of a single helix extending to one end and adapted to fit snugly over the end of the implement handle, the helix being cylindrical at the free end throughout the handle engaging part and having a plurality of handle engaging turns, said helix having a section smaller in diameter than the handle engaging part, the other portion of the wire extending from the reduced section of the helix and being shaped in the form of a loop, the reduced section of the helix constituting a flexible connection between the handle engaging portion of the helix and the loop.

2. An attachment for implement handles comprising a single wire, one portion of the wire being coiled in the form of a single helix extending to one end and adapted to fit snugly over the end of the implement handle, the helix being cylindrical at the free end throughout the handle engaging part and having a plurality of handle engaging turns, said helix having a section smaller in diameter than the handle engaging part, the other portion of the wire extending from the reduced section of the helix and being shaped in the form of a hanger engaging means, the reduced section of the helix constituting a flexible connection between the handle engaging portion of the helix and the means.

RALPH F. HENN.